United States Patent [19]

Schumer et al.

[11] Patent Number: 5,322,251
[45] Date of Patent: Jun. 21, 1994

[54] TWO-SHOE ADAPTER KIT FOR MOUNTING MICROPHONES AND LIGHTS ON TELEVISION CAMERAS AND VIDEO RECORDERS

[75] Inventors: Scott R. Schumer, Bedminster; Bruce M. Engler, Hoboken; Charles H. Engler, Murray Hill, all of N.J.

[73] Assignee: Merlin Eng, Inc., New Providence, N.J.

[21] Appl. No.: 921,302

[22] Filed: Jul. 28, 1992

[51] Int. Cl.$^5$ .......................................... F16M 11/04
[52] U.S. Cl. .................................... 248/187; 354/293
[58] Field of Search ................ 248/187; 354/76, 126, 354/293, 295; 362/3; 358/229, 224

[56] References Cited

U.S. PATENT DOCUMENTS

| D. 150,051 | 6/1948 | Benson . | |
|---|---|---|---|
| D. 156,276 | 11/1949 | Powell . | |
| 2,652,220 | 9/1953 | Nocht . | |
| 2,831,808 | 4/1958 | Essett et al. . | |
| 3,074,338 | 1/1963 | Hanscom | 354/293 X |
| 3,134,547 | 5/1964 | Kapteyn et al. . | |
| 3,333,093 | 7/1967 | Robinson | 354/126 X |
| 3,402,906 | 9/1968 | Wellman | 354/293 |
| 3,550,519 | 12/1970 | Lewis | 354/293 |
| 3,586,278 | 6/1971 | Simons . | |
| 3,703,131 | 11/1972 | Brigham . | |
| 4,241,988 | 12/1980 | Lepp | 354/293 |
| 4,319,825 | 3/1982 | Newton | 354/293 |
| 4,591,250 | 5/1986 | Woodruff | 354/76 |
| 4,752,794 | 6/1988 | Bohannon | 354/293 X |
| 4,866,465 | 9/1989 | Gallegos | 354/126 |
| 4,926,262 | 5/1990 | Rowens . | |
| 5,031,872 | 7/1991 | Vance | 248/187 X |

FOREIGN PATENT DOCUMENTS

| 1517760 | 9/1966 | France | 354/293 |
|---|---|---|---|
| 1-316732 | 12/1989 | Japan . | |
| 2087592 | 5/1982 | United Kingdom . | |

Primary Examiner—J. Franklin Foss

[57] ABSTRACT

A tool box attachment kit for attaching accessories in connection with the use of television and video cameras having a two-shoe base bar with female shoes approximate to the first and second longitudinal ends of the base bar. The shoes are disposed in the same plane and have at least one threaded bore hole located therebetween and extending substantially perpendicular to their plane. The kit also includes an extension rod having a single male shoe attached at a first end and having a threaded section adjoining said single male shoe at the first end and wherein the threaded section is adapted to engage the threaded bore hole of said base bar. The kit contains various other cooperative components which can be assembled to provide a universal attachment assembly for video and television cameras.

24 Claims, 2 Drawing Sheets

TWO-SHOE ADAPTER KIT FOR MOUNTING MICROPHONES AND LIGHTS ON TELEVISION CAMERAS AND VIDEO RECORDERS

BACKGROUND OF THE INVENTION

1. Field of the Invention

The invention relates to a mounting means for cameras and accessories providing a tool box for attaching accessories such as lamps, microphones, etc. to a camera, to a pistol grip, to a fishpole boom, and the like.

2. Brief Description of the Background of the Invention Including Prior Art

Currently, there is no standard way to mount more than one microphone, light or the like onto a video camera. Some cameras provide a "female shoe" into which a microphone's male shoe or a light's male shoe is mounted. Some cameras provide a ¼-20 accessory thread into which the microphone's ¼ inch male thread or a light's ¼ inch male thread is mounted. The problem is, not all microphones and lights can be adapted to mount into both types of fixtures on the video camera. One may have a microphone that will mount easily on a camera with a shoemount type of fixture, but not into the ¼-20 thread—or vice versa. Adaptors are made for some accessories, but it becomes quite a task to find all the pieces needed to cover every situation.

More importantly, cameras that do provide two fixtures for simultaneous microphone mounting and light mounting do not allow for conflicts in positioning of the pieces to be mounted. That is, a camera may provide two shoemounts, but they are placed linearly (or back to back) causing the microphone and the light to be in each other's way. The camera's design provides a fixed, unchangeable state.

Some cameras provide the ¼-20 thread and a shoemount or just two ¼-20 threads. The problem that arises again is that the fixtures are unmovable. The cameraman is at the mercy of where these fixtures are located on the camera. If his microphone comes only with a ¼-20 thread, he must mount it where the camera manufacturer has placed this fixture. This may place the microphone right in the middle of the light's light field because he is forced to mount the light behind the microphone. The result is a visible shadow on the subject being video-taped and this is unacceptable for critical camera work.

U.S. Pat. No. 4,752,794 to Bohannon, issued 1988, teaches a multiple shoe assembly for the attachment and removal of accessories on a standard 35 mm camera. More specifically, the device consists of a grip handle that telescopically extends from a base portion to which the camera is attached. At the top of the telescopic grip handle is a universal head which includes a female shoe on its top surface. The universal head includes a lock screw that intersects an aperture which receives an accessory bar that is movable and horizontally adjustable with respect to the grip handle post by tightening or loosening the lock screw. At the distal end of the accessory bar there are two additional female shoes in a 180 degree spatial relationship to one another.

U.S. Pat. No. 4,591,250 to Woodruff, issued May 27, 1986 teaches a standard camera hot shoe with a level attached on a threaded mount where a base serves as a male shoe, which is slidably attached to the female counterpart on the top of the camera.

U.S. Pat. No. 5,031,872 to Vance, et al., issued Jul. 16, 1991, discloses a microphone noise frequency and vibration absorbing mount which is merely a variation on the standard one-shoe mount well known in the art. The device consists of a hollow, accordion-like resilient material attached to a rectangular base, the bottom of which has a standard male shoe that slidably attaches to a female shoe on the top of a video camera. Attached to the top surface of the resilient accordion-like material is a female type shoe device which receives the male shoe of a microphone.

U.S. Pat. No. 3,333,519 to Padelt, issued Aug. 1, 1967, teaches and claims a mounting means for camera accessories, where a flash attachment, a tripod, and a handle can be simultaneously attached to a camera by means of a mounting stud. The accessories are attached to the mounting stud at three different points by means of a locking screw that threads into a socket at each of the three different positions, i.e., at the base of the camera for the tripod, and at each of the two sides of the camera for the handle and flash.

U.S. Pat. No. 4,051,493 to Nakagawa et al., issued 1977, teaches a flash holder for a camera made primarily for underwater photography. The flash holder consists of an elongated arm that possesses grooved arm holders at the distal ends with clamps that rotatably attach to the camera and the flash portion respectively. By loosening the clamps, the arm may be moved with respect to the camera, the flash unit and/or both.

U.S. Pat. No. 4,866,465 to Gallegos, issued 1989, discloses another device for eliminating shadows caused by a flash mechanism. The device is comprised of a unitary mounting bracket for supporting the camera and the flash unit while positioning the flash unit above and rearwardly of the camera lens at a distance that avoids both "red-eye" in the subjects and shadows. The bracket includes a track means with an accessory shoe to which the flash unit is mounted. This enables the flash unit to be moved 90° about the camera lens by merely loosening the screw that secures the shoe to the tract means. Whenever the camera must be rotated in order to change the format, the flash can also be moved with respect to the lens so that it is always above and rearward of it. This is but another teaching of adjustable light sources, but again there is no suggestion of a two-shoe device and its application in attaching two accessories to a video camera while at the same time solving the camera/microphone/light spatial interference problems.

U.S. Pat. No. 4,550,343 to Nakatani, issued 1985, teaches a standard video camera with a special switch circuit that insures correct stereophonic recording when a rotatable and detachable stereo microphone is attached to the camera. This is important when the electronic view finder is in a reverse posture mounting as opposed to a normal forward posture mounting.

U.S. Pat. No. 4,392,183 to Ostlund et al., issued 1983, U.S. Pat. No. 4,091,402 to Siegel (1978), and U.S. Pat. No. 4,030,114 to Telfer, issued 1977, all teach various proposals for movably securing modular lighting accessories to cameras so as to afford the photographer ultimate lighting under different conditions. All these references involve slidable posts, some telescopic, with lockable or engageable lock means that provides variable light orientation positions with respect to the camera lens.

U.S. Pat. No. 4,984,135 to Crouch, issued 1991, U.S. Pat. No. 3,527,437 to Lippman, issued 1970, U.S. Pat. No. 2,479,716 to Bensen, issued 1949, and U.S. Pat. No.

2,130,262 to Burlin, issued 1938, all teach various bracket means for either attaching a lighting source or handle/tripod mount to a camera. The references teach using threadable posts ('135) and brackets ('437) that allow for the movable attachment of accessories.

SUMMARY OF THE INVENTION

1. Purposes of the Invention

It is an object of the present invention to provide a tool kit for a camera which allows to securely mount accessories to the camera.

It is a further object of the present invention to provide a mounting means, which is configurable as to a plurality of positions above a camera.

It is yet a further object of the present invention to provide a modular set of elements providing an intermediate frame structure between a camera and an accessory to be disposed at a precise position in the neighborhood of the camera.

It is an additional object of the present invention to provide a flexible way in which to simultaneously mount a light and a microphone on a video camera.

It is a further object of the present invention to provide for a mounting means which accepts a broad range of accessory mounting requirements which vary from manufacturer to manufacturer.

These and other objects and advantages of the present invention will become evident from the description which follows.

2. Brief Description of the Invention

The present invention provides for a tool box attachment for attaching accessories in connection with use of a camera. A two-shoe base bar of a substantially rectangular parallelepipedal form have a longest axis, a medium axis, and a short axis. Two female shoes are disposed parallel to a plane spanned by the longest and the medium axes of the two-shoe base bar and are disposed near longitudinal ends of the two-shoe base bar. The female shoes are in each case formed by a T groove having two side rails. A plurality of threaded boreholes, for example, three threaded boreholes are extending in parallel to the short axis of the two-shoe base bar and are disposed sequentially in a direction of the longest axis of the two-shoe base bar. An extension rod has a single male shoe attached at a first end and has a threaded section substantially adjoining the single male shoe at the first end. The threaded section is adapted to engage one of the three threaded boreholes.

A long extension rod can have a single male shoe attached at a first end, a first threaded section substantially adjoining the single male shoe at the first end, and a second threaded section extending from a second end of the long extension rod. The first threaded section and the second threaded section can be adapted to engage one of the three threaded bore holes. The long extension rod can be furnished with a non-threaded center section having a diameter smaller than an inner clear opening of an inner thread engaging the first threaded section and the second threaded section, respectively.

An extension rod can exhibit an upper threaded end, a lower thread, and a center section. The upper threaded end can match the thread of the boreholes of the two-shoe base bar. The lower thread can match a female mounting thread of a camera. The center section can exhibit an enlarged outer diameter as compared to the upper threaded end and the lower thread of the extension rod to prevent a lock nut to pass from one to the other thread.

A locking nut can have an inner thread matching the same threaded rods as the threaded boreholes of the two-shoe base bar.

A circular step can be furnished at the locking nut for clamping the two-shoe base bar to the extension rod passing through a borehole and for pressing against rails formed at the T groove, respectively.

A reversible adapter can have a first end with an internal thread for attaching a threaded rod matching and fitting the threads of the two-shoe base bar. The reversible adapter can have a second end with a borehole matching the same threaded rods as do the boreholes of the two-shoe base bar. The second end of the reversible adapter can exhibit an outer thread for attachment of the reversible adapter to an accessory.

The reversible adapter can exhibit an undercut intermediate section with a narrower outer diameter as compared to an outer diameter of the first end and an outer diameter of a limiting collar or disk adjoining the second end of the reversible adapter.

The present invention tool kit eliminates the conventional complications involved in attempting a simultaneous mounting of a microphone and of a light onto a video camera.

The invention structure provides at least two female shoes on opposite ends of a rectangular base with a plurality of centrally located passageways that are threaded for the reception of likewise threaded extension posts that both secure the device to the female shoe on a video camera and attach multiple video accessories.

The invention comprises a two-shoe mount providing means to attach more than one accessory to a video camera without requiring a modification of the camera. In particular, the two-shoe mount provides a flexible way to simultaneously mount both a microphone and a light source on a video camera such as those used by news teams and other portable video applications. The two-shoe mount enables both the light and the microphone to be functional at the same time during recording without interfering with one another. For example, the light need not be positioned behind the microphone which results in a shadow on the subject nor will the light source interfere with sound pick-up through the placement thereof in front of the microphone. This positioning and mounting mode apparently has not been achievable in the past on many cameras without substantial modification of the camera using gaffer tape which is both awkward and cumbersome.

The two-shoe structure as depicted in the drawings consists essentially of a rectangular base with a plurality of screw threaded passageways that extend contiguously through the base. At each end of the two-shoe base flanking the screw threaded passageways are two standard female shoes grooved into the base surface. The accessories can be slidably attached here if they have their own male shoes attached or may be threaded onto a post which has a male shoe at one end that is provided as a part of the invention. Other threaded extension posts are provided that can attach to other accessories via the screw threaded passageways in the base which can be secured using locking nuts.

The two-shoe attachment not only permits the mounting of more than one accessory to a video camera, but additionally allows for easy assembly and disassembly of these accessories relative to the camera. The two-shoe base bar can be elevated above the camera for unobstructive operation and the threaded extension posts allow for an adjustment of the height and for a spacing of the accessories with respect to the camera and each other. This allows for noise free microphone reception and "shadowless" illumination during operation of the camera.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

Other characteristics and advantages of the invention are set forth in the description which follows below and in the annexed drawings, in which.

DESCRIPTION OF INVENTION AND PREFERRED EMBODIMENT

Figure 1:
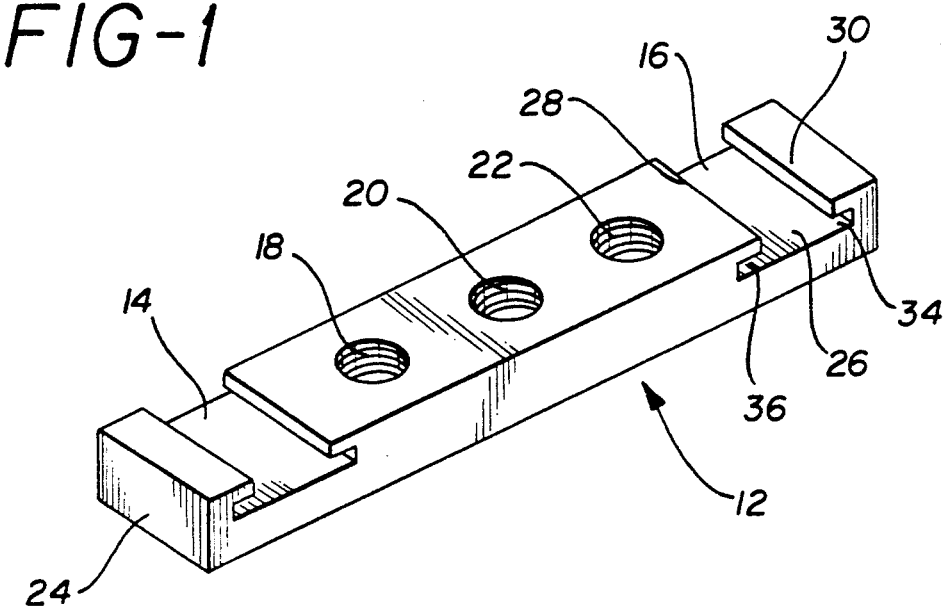
FIG. 1 is a perspective view of a two-shoe base for providing a support to camera accessories.

The two-shoe base bar 12 can be formed from a rectangular rod. The two-shoe base bar 12 exhibits on one of the two largest sides two female shoes 14, 16 provided by T grooves for inserting a holding member. Such holding member is shown for example, in FIG. 4. The two-shoe base bar 12 exhibits between the female shoes 14, 16 a plurality of boreholes 18, 20, 22 such as for example three boreholes 18, 20, 22 shown in FIG. 1, but alternatively two, four, or even more boreholes can be provided. Employing three boreholes provides an excellent compromise regarding the complexity and the extension possibilities of the two-shoe base bar 12. The boreholes 18, 20, 22 shown in FIG. 1 are threaded. The boreholes 18, 20, 22 are provided through openings in the largest sides of the two-shoe base bar 12 and are passing fully through the two-shoe base bar 12. Preferably, these boreholes 18, 20, 22 intersect with a center axis 24 of the two-shoe base bar 12, where the center axis 24 is running in the longitudinal direction of the two-shoe base bar 12. The diameter of the boreholes 18, 20, 22 can be from about 0.1 to 0.6 of the width of the two-shoe base bar 12 intersecting the boreholes in each case along a circle line. The diameter of the boreholes 18, 20, 22 can correspond to from about 0.5 to 2.0 times the width of the narrowest thickness of the two-shoe base bar 12, i.e. the width parallel to an axis of the boreholes 18, 20, 22. The boreholes 18, 20, 22 are provided with a thread which is suitable for carrying substantial loads placed on a bolt entered and set into the threaded hole.

The female shoes 14, 16 are disposed extending in the direction of the medium extension of the bar and have substantially uniform cross-sections for various intersections disposed parallel to the medium surface plane of the two-shoe base bar 12. The bottom face 26 of the female shoe 14, 16 is disposed within an area of a middle third of the narrowest thickness of the two-shoe base bar 12. The bottom face 26 of the female shoe 14, 16 corresponds to a rectangle which is nearly square. This means that the size difference between the longest and shortest sides of the rectangle is no more than 20% of the longer side of the rectangle representing the bottom face 26 of the female shoe 14, 16. The female shoe 14, 16 is furnished with two hooks or rails 28, 30, which hold the engaging holding member 32. The projection length of the hooks or rails 28, 30 is from about 1.0 to 3.0 times, and preferably from 1.5 to 3.5 times the width of the groove 34, 36 defined by the hooks or rails 28, 30 and the bottom face 26 of the female shoe 14, 16.

Figure 2:
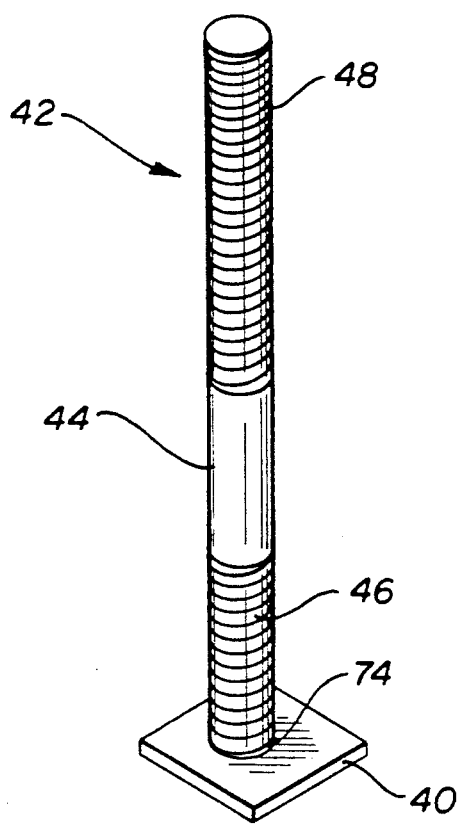
FIG. 2 is a long extension rod with a male shoe to be fitted on a female shoe of a camera.

FIG. 2 shows a long extension rod 42. The long extension rod 42 has a male shoe section 40 which fits a camera's single female shoe. The male shoe section 40 of the long extension rod 42 is followed by a first threaded section 46 which is suitable for positioning a lock nut or a jam nut 38 (FIG. 6) to hold the male shoe 40 of the long extension rod 42 tightly in a camera's single female shoe. The long extension rod 42 is provided by an upset rod or a double end rod or a silo rod. The diameter of the long extension rod 42 in its middle section 44 without thread is such that the lock nut 38 can pass over the middle section 44 without being engaged or stopped by the middle section 44. The second end 48 of the long extension rod 42 is further furnished with a thread preferably of the same threading pitch as the lower part to fit into the threaded boreholes 18, 20, 22 of the two-shoe base bar 12. Lock nuts 38 can be employed which will lock the long extension rod 42 in the two-shoe base bar 12.

Figure 3:
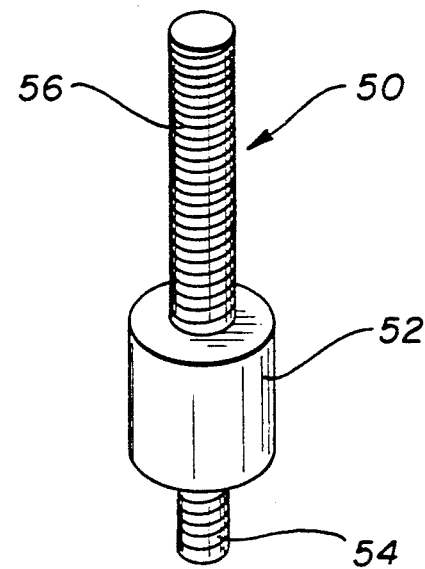
FIG. 3 is a perspective view of a shaft exhibiting a fastener to a camera and a fastener to the two-shoe base.

In addition to cameras which are provided with a female shoe for attachments, there are also cameras which provide a threaded bore for attachments. For example, the "Sony" style camera provides a ¼-inch thread. FIG. 3 shows an extension rod 50 adapted to such cameras. The extension rod 50 in this case is constructed slightly different, since the thread of the second end to be fitted into the two-shoe base bar 12 is different as compared to the first end which is to be fitted into the "Sony" style camera, or any other cameras providing a ¼-20 inch female thread. Consequently, the middle section 52 of this extension rod 50 of FIG. 3 can be thicker because it is not necessary, or better not possible, for a lock nut 38 to fit the upper thread 56 of the extension rod 50 and the lower thread 54 of the extension rod 50 to pass from either side onto the thread disposed on the other side.

Figure 4:
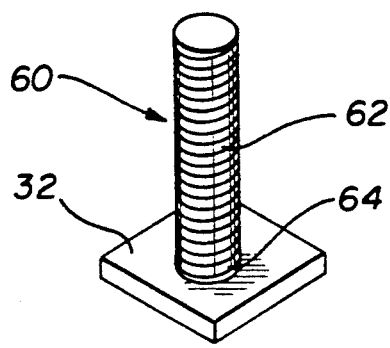
FIG. 4 is a perspective view of an insertion member for one of the female shoes of the two-shoe base.

FIG. 4 shows an attachment support for an accessory of a camera. The attachment support element 60 for a camera is similar in its general construction to the long extension rod 42 of FIG. 2. The support element 60 of FIG. 4 corresponds substantially to a long extension rod 42 like that of FIG. 2, where the straight middle section 44 without threads and the second thread end 48 are cut off from the long extension rod 42 of FIG. 2, however, including the male shoe 40 and the first threaded section 46 neighboring to the male shoe 40. The threaded section 62 of the embodiment of FIG. 4 is separated from the male shoe 32 by a undercut 64 to improve operation of a locking nut 38.

Figure 5:
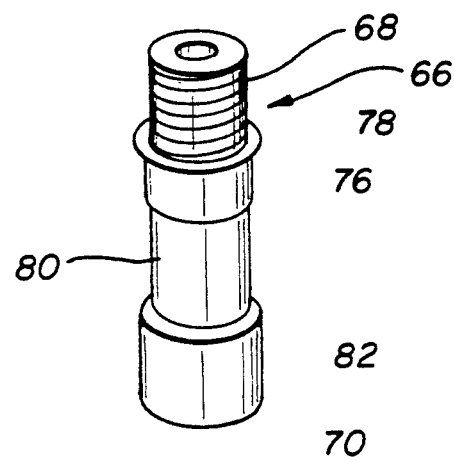
FIG. 5 is a view of a reversible adapter for attachment to an extension or for receiving a socket of an accessory.

FIG. 5 shows a reversible adapter 66 which is provided for a ⅜ thread or stud mount camera accessories having a ⅜ internal thread. The first end 68 of the reversible adapter 66 has an inner thread which can be fitted to the thread of an extension threaded into the borehole 18, 20, 22 of the two-shoe base bar 12 or, alternatively as shown, the second end 82, furnished with a threaded borehole 70, which matches a thread, for example, can be fitted to a ⅜-inch thread of an extension. Thus, one long extension rod 42 can be used to be attached to the camera, then the second threaded end 48 of the long extension rod 42 is threaded through one of the boreholes 18, 20, 22 of the two-shoe base bar 12, and the second threaded end 48 of the long extension rod 42 can then carry a reversible adapter 66. The reversible adapter 66 is therefore furnished both at its first end 68 and at its second end 82 with an inner thread, which inner thread matches the outer threads of the extensions 44, 72. Once the reversible adapter is threaded onto the second end 48 of the long extension rod 42, the outer thread of the first end 68 can fit onto an inner thread of a camera accessory.

The outer unthreaded second end 82 with the undercut intermediate section 80 can be used to mount accessories, such as a lamp, having a stud-mount female base. Said intermediate section 80 exhibits a narrower outer diameter as compared to the limiting collar or disk 76 and to the second end 82 for reliably and repeatedly connecting the reversible adapter 66 to a socket sleeve of an accessory. The second end 82 of the reversible adapter 66 can be inserted into the socket sleeve of an accessory up to the limiting collar or disk 76. A set screw can fasten the socket sleeve onto the intermediate section 80 of the reversible adapter 66.

Alternatively, another long extension can be inserted into the threaded borehole of the first end 68 of the reversible adapter 66, this process can be continued, thereby providing the possibility of attaching a variable number of fixed extensions successively to a camera as desired for obtaining larger distance extensions. This fixed extension can be located coaxially relative to the axis defined by the camera's single female shoe or can be at an axis parallel to the axis defined by the single female shoe of the camera, whereby the axial distance between the two parallel axes is defined by the distance of the borehole in the two-shoe base bar 12. Locking nuts as shown in FIG. 6 are employed to attach the extension rods and the feet of the members of FIGS. 2 and 4 to the two-shoe base bar 12 and to the camera's single female shoe, respectively.

In particular, the tool box of the applicant of the present application allows to mount both a light and a microphone onto a camera. The long extension rod 42 generally is constructed such that it clears the handle of the camera.

The tool box including the two-shoe base bar 12 having two female shoes 14, 16 provides a stable accessory to a camera. The female shoes 14, 16 having T grooves 34, 36 provide a plain bar guide for the feet 40, 32 of the long extension rod 42 of FIG. 2 and of the attachment support 60 of FIG. 4. The mounting member or attachment support 60 of FIG. 4 and the long extension rod 42 of FIG. 2 can slide in the T grooves 34, 36. The attachment support 60 of FIG. 4 and the long extension rod 42 of FIG. 2 can be fixed in the T grooves 34, 36 by employing a locking nut 38 to be tightened against the outer side of the two-shoe base bar 12, thereby squeezing the hooks and rails 28, 30 of the female shoes 14, 16 from two sides.

Figure 6:
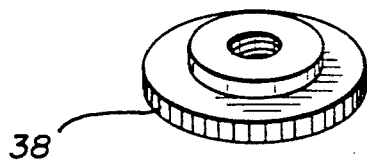
FIG. 6 is a perspective view of a lock nut.
Figure 7:
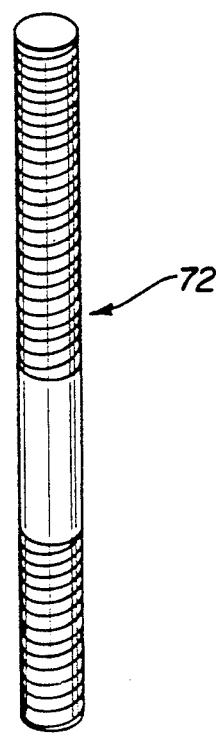
FIG. 7 is a perspective view of a long extension rod similar to FIG. 2, however without a male shoe.

The locking nuts 38 as shown in FIG. 6 are employed to secure the position of the pieces to be mounted. The members 42, 60 of FIG. 2 and FIG. 4 are to be locked at the shoe base to assure a firm mounting of the camera mounting and a fixed position of the two-shoe base bar 12 relative to the camera. The two-shoe base bar 12 needs to be secured with a locking nut 38 to prevent any unwanted movement. Furthermore, a locking nut 38 could be used directly underneath the two-shoe base bar 12. Whatever is to be mounted to the extension attached to the camera, such as the members shown in FIGS. 2 and 3, has to be locked securely after choosing the desired position. Consequently, the tool box or adapter kit in this case would include perhaps five locking nuts 38 to provide a defined position. The locking nuts 38 assure a secure and noise-free mounting and assembling.

Furthermore, if shadow problems occur, i.e. the microphone casts a shadow into the field illuminated by the light source, then the extension rods 42, 50 of FIGS. 2 and the 3 can be placed into one of the outer boreholes 18, 22 of the two-shoe base bar 12. The two-shoe base bar 12 can be placed at an angle such that one female shoe is disposed toward the front of the camera and one female shoe is disposed toward the back of the camera. The light can be mounted in the front shoe and the microphone in the rear shoe.

It is further possible to employ a plurality of two-shoe base bars 12 in cases where larger distances have to be covered or additional accessories or elements are necessary in using the camera. The second two-shoe base bar is attached to the first two-shoe base bar in a similar way as the first two-shoe base bar is attached to the camera.

The presence of two female shoes 14, 16 and of three boreholes 18, 20, 22 on a two-shoe base bar 12 generates the possibility of an attachment of up to seven elements and to place the seven elements at a fixed position relative to the male shoe of the extension. Each of the female shoes 14, 16 having grooves 34, 36 allows one attachment and each of the boreholes 18, 20, 22 allows two attachments since the boreholes 18, 20, 22 are accessible from two sides.

The tool box or mounting kit further allows, in view of the threads, to maintain an alignment direction relative to the borehole or to the single female shoe provided at the camera. All elements are constructed such that they can fit at right angles or are aligned relative to the extensions, as shown on FIGS. 2 or 3.

The long extension rod 42 of FIG. 2 can employ a male shoe 40 in the shape of a plate having a thickness of 0.070 inch, and the male shoe 40 can cover a square area with the sides 0.735 inch long. The male shoe 40 attached to the long extension rod 42 and, adjoining the male shoe 40, there is provided an undercut 74 of the long extension rod 42 having a length of 1/16 inch and having a radial depth of 1/32 inch. The lower thread or first threaded section 46 can have a length of ¾ inch followed by an arbitrary length of a middle section 44 of the long extension rod 42 having a thickness of 19/64 inch diameter. A second thread or second end 48 can follow to the middle section 44 of the long extension rod 42 and have a length of from about 1¼ inches to 2½ inches, and preferably 1½ inches, and have a thread of ⅜ - 16. The total length of the long extension rod 42 can be 3¾ inches. The long extension rod 42 is preferably produced from aluminum and is anodized, for example, with a dye furnishing a satin olive drab.

The short extension rod 50 of FIG. 3 is similar to the long extension rod 42 of FIG. 2. The length of the shaft 52 can be from ⅝ inch to 1¾ inches and is preferably 1¼ inches. The remaining dimensions are the same as those recited in connection with FIG. 2 for corresponding elements.

The locking nut 38 of FIG. 6 can have an outer diameter of 1⅛ inches and can have a borehole with a ⅜ - 16 thread. A circular projection can be provided on the upper and lower axial side of the locking nut 38. The projection can have a height of 1/32 inch and can have a width of ¾ inch and can be provided on two sides of the locking nuts 38. The outside of the locking nut 38 is furnished with grooves or with a rough surface in order to allow easy handling during the attachment process of the members of the tool box or mounting kit.

The two-shoe base bar 12 can have three boreholes 18, 20, 22 with ⅜ - 16 taps. The two-shoe base bar 12 can have boreholes 18, 20, 22, where each borehole can be spaced at a distance of ¾ inch from a neighboring borehole. The distance between the center line of the female shoes 14, 16 can be from 3 inches to 4 inches and is preferably 3⅛ inches. The smallest thickness of the two-shoe base bar 12 can be ⅜ inch. The width of the two-shoe base bar 12 can be ¾ inch, and the total length of the two-shoe base bar 12 can be 4 inches to 5 inches and is preferably 4¼ inches. The bottom faces of the female shoes 14, 16 should be completely planar and aligned with the largest face of the T bar and should be perpendicular to the direction of the threads of the boreholes 18, 20, 22 in the two-shoe base bar 12. The reversible adapter 66 of FIG. 5 can be furnished at the first end with an outer thread of a ⅜ inch length in axial direction with a thread type of ⅜ -27. There can be a 1/16 inch diameter undercut 78 between the root of the thread and a limiting disk 76. The reversible adapter 66 can have a center shaft 80 of a length of, for example, ⅝ inch, and there can be a second end 82 having a length of ⅜ inch with a inner thread borehole 70 for attachment to the extension bar, to the long extension rod, or to the extension rod shown in FIG. 3. The total length of the reversible adapter 66 can be about 1¾ inches. The outer width at the ends can be ⅝ inch and at the limiting disk 76 can be 11/16 inch. The unthreaded second end 82 can be used to mount stud-mount accessories using the undercut section 80 for being pressed by a locking screw.

The extension rod 50 of FIG. 3 can have a lower end 54 having a length of ¼ inch and having ¼ - 20 thread to be attached to the camera. This is followed by a 1/32 inch undercut radius to the root of the thread. This is then followed by a ¾ inch diameter fine straight knurl 52 having a length in axial direction of ¾ inch. The knurl 52 allows an easy attachment of the lower end 54 of the extension rod 50 to the top of a camera of the "Sony" style or any other cameras providing ¼ - 20 threads.

At the top of the fine knurl 52, there is provided another 1/32 undercut radius, which extends to the root of the thread of a 1¼-inch or 1¾-inch long screw thread ⅜ - 16 provided at a second end 56 of the extension rod 50 of FIG. 3. The second end 56 of the extension rod 50 can be threaded into a borehole 18, 20, 22 of the two-shoe base bar 12.

All elements are preferably produced from aluminum. However, other materials such as steel, stainless steel, and other materials can be employed for the invention product.

It will be understood that each of the elements described above, or two or more together, may also find a useful application in other types of adapter kits for mounting elements onto equipment in connection with use of a camera differing from the types described above.

While the invention has been illustrated and described as embodied in the context of a two-shoe adapter kit for mounting microphones and lights on television cameras and video recorders, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A tool box attachment kit for attaching accessories in connection with use of television and video cameras comprising:
   a two-shoe base bar of a substantially rectangular parallelepipedal form with a longest axis, a medium axis, and a short axis, wherein two female shoes are disposed parallel to a plane spanned by the longest and the medium axes of the two-shoe base bar and are disposed near longitudinal ends of the two-shoe base bar, wherein the female shoes are in each case formed by a T groove having two side rails, wherein at least one threaded borehole is located between said female grooves and extends parallel to the short axis of the two-shoe base bar;
   an extension rod having a single male shoe attached at a first end and having a threaded section substantially adjoining the single male shoe at the first end, wherein the threaded section is adapted to engage said borehole.

2. A tool box attachment kit according to claim 1, further comprising a long extension rod having a single male shoe attached at a first end, having a first threaded section substantially adjoining the single male shoe at the first end, and having a second threaded section extending from a second end of the long extension rod, wherein the first threaded section and the second threaded section are adapted to engage said borehole.

3. The tool box attachment kit according to claim 2, wherein the long extension rod is furnished with a non-threaded center section having a diameter smaller than an inner clear opening of an inner thread engaging the first threaded section and the second threaded section, respectively.

4. The tool box attachment kit according to claim 1, further comprising an extension rod having an upper threaded end, a lower thread, and a center section, wherein the upper threaded end matches the thread of the boreholes of the two-shoe base bar, wherein the lower thread matches a female mounting thread of a television or video camera, and wherein the center section exhibits an enlarged outer diameter as compared to the upper threaded end and the lower thread of the extension rod for gripping and providing a seating surface against which said camera or base bar can rest and to prevent a lock nut from passing from one to the other thread.

5. The tool box attachment kit according to claim 1, further comprising a locking nut having an inner thread matching the same threaded rods as the threaded boreholes of the two-shoe base bar.

6. The tool box attachment kit according to claim 5, further comprising a circular seating step furnished at the locking nut for clamping the two-shoe base bar to the extension rod passing through a borehole and for pressing against rails formed at the T groove, respectively.

7. The tool box attachment kit according to claim 1, further comprising a reversible adapter having a first end with an internal thread for attaching a threaded rod matching and fitting the threads of the two-shoe base bar and having a second end with a borehole matching the same threaded rods as to the boreholes of the two-shoe base bar, wherein the second end of the reversible adapter exhibits an outer thread for attachment of the reversible adapter to an accessory.

8. The tool box attachment kit according to claim 7, wherein the reversible adapter exhibits an undercut intermediate section with a narrower outer diameter as compared to an outer diameter of the first end and an outer diameter of a limiting collar adjoining the second end of the reversible adapter.

9. A tool box attachment kit for attaching accessories in connection with use of a television or video camera comprising:
- a two-shoe base bar of a substantially rectangular parallelepipedal form with a longest axis, a medium axis, and a short axis, wherein two female shoes are disposed parallel to a plane spanned by the longest and the medium axes of the two-shoe base bar, wherein the female shoes are formed by a T groove having two side rails, wherein two threaded boreholes are extending in parallel to the short axis of the two-shoe base bar and are disposed sequentially in a direction of the longest axis of the two-shoe base bar;
- an extension rod having a single male shoe attached at a first end and having a threaded section substantially adjoining the single male shoe at the first end, wherein the threaded section is adapted to engage one of the two threaded boreholes.

10. The tool box attachment kit according to claim 9, further comprising a long extension rod having a single male shoe attached at a first one end, having a first threaded section substantially adjoining the single male shoe at the first end, and having a second threaded section extending from a second end of the long extension rod, wherein the first threaded section and the second threaded section are adapted to engage one of the two threaded boreholes.

11. The tool box attachment kit according to claim 10, wherein the long extension rod is furnished with a non-threaded center section having a diameter smaller than an inner clear opening of an inner thread engaging the first threaded section and the second threaded section, respectively.

12. The tool box attachment kit according to claim 9, further comprising an extension rod having an upper threaded end, a lower thread, and a center section, wherein the upper threaded end matches the thread of the boreholes of the two-shoe base bar, wherein the lower thread matches a female mounting thread of a television or video camera, and wherein the center section exhibits an enlarged outer diameter as compared to the upper threaded end and the lower thread of the extension rod for gripping and providing a seating surface against which said camera or base bar can rest and to prevent a lock nut from passing from one to the other thread.

13. The tool box attachment kit according to claim 9, further comprising a locking nut having an inner thread matching the same threaded rods as the threaded boreholes of the two-shoe base bar.

14. The tool box attachment kit according to claim 13, further comprising, a circular seating step furnished at the locking nut for clamping the two-shoe base bar to the extension rod passing through a borehole and for pressing against rails formed at the T-groove, respectively.

15. The tool box attachment kit according to claim 9, further comprising a reversible adapter having a first end with an internal thread for attaching a threaded rod matching and fitting the threads of the two-shoe base bar and having a second end with a borehole matching the same threaded rods as do the boreholes of the two-shoe base bar, wherein the second end of the reversible adapter exhibits in addition an outer thread for attachment of the reversible adapter to an accessory.

16. The tool box attachment kit according to claim 15, wherein the reversible adapter exhibits an undercut intermediate section with a narrower outer diameter as compared to an outer diameter of the first end and an outer diameter of a limiting collar adjoining the second end of the reversible adapter.

17. A universal attachment kit for mounting on audio visual equipment having components comprising: a two-shoe base bar having a first and second longitudinal end, each of said ends having a female shoe approximate thereto, said female shoes being disposed in the same plane and being formed by a T groove and wherein at least one threaded borehole is located between said female shoes and extends into said base bar substantially perpendicular to the plane of said female shoes; and an extension rod having a single male shoe attached at a first end and having a threaded section substantially adjoining said single male shoe at the first end, wherein the threaded section is adapted to engage the threaded borehole of said base bar.

18. The universal attachment kit of claim 17 further comprising as a component an extension rod having an upper threaded end, a lower thread, and a center section wherein the upper threaded end matches the thread of the borehole of the base bar, wherein the lower thread matches a female mounting thread of an audio visual device and wherein the center section exhibits an enlarged outer diameter as compared to the upper threaded end and the lower thread of the extension rod for gripping and providing a seating surface against which the lower threads can be secured to said audio visual device and to prevent a locknut from passing from one thread to the other.

19. The universal attachment kit of claim 18 further comprising as a component a locking nut having an inner thread matching the same threaded rods as the threaded borehole of the base bar.

20. A universal attachment kit for mounting an audio visual equipment having co-located components comprising: a two-shoe base bar having a first and second longitudinal end, each of said ends having a female shoe approximate thereto, said female shoes being disposed in the same plane and being formed by a T groove, and wherein at least one threaded borehole is located between said female shoes and extends into said base bar substantially perpendicular to the plane of said female shoes; an extension rod having a single male shoe attached to the first end and having a threaded section substantially adjoining said single male shoe at the first end, wherein the threaded section is adapted to engage the threaded borehole of said base bar;

a second extension rod longer than said first extension rod and having a single male shoe attached to the first end, a first threaded section substantially adjoining said single male shoe at the first end, and having a second threaded section extending from a second end of said longer extension rod, wherein the first threaded section and the second threaded section are adapted to engage the borehole of said base bar; an extension rod having an upper threaded end, a lower thread, and a center section, wherein the upper threaded end matches the thread of the borehole of said base bar, and wherein the lower thread matches a female mounting thread of an audio visual device, and wherein the center section exhibits an enlarged outer diameter as compared to the upper and lower threaded ends for gripping and providing a seating surface against which the lower threads can be secured to said audio visual device and to prevent a locknut from passing from one thread to another; and a locking nut having an inner thread matching the same threaded rods as those that match the borehole of the base bar.

21. The universal attachment kit of claim 20 wherein the base bar contains three threaded boreholes located between said female shoes and extending into said base bar substantially perpendicular to the plane of said female shoes.

22. The universal attachment kit of claim 21 wherein said base bar is substantially rectangular parallelepipedal in form.

23. The universal attachment kit of claim 22 wherein the boreholes are disposed sequentially in the direction of the longitudinal axis.

24. The universal attachment kit of claim 23 further comprising at least four additional locknuts.

* * * * *